United States Patent Office 3,281,400
Patented Oct. 25, 1966

3,281,400
CROSSLINKAGE OF POLYMERS CONTAINING AMIDE GROUPS
Wilhelm Kunze, Frankfurt am Main-Fechenheim, Germany, assignor to Cassella Farbwerke Mainkur Aktiengesellschaft, Frankfurt am Main-Fechenheim, Germany, a company of Germany
No Drawing. Filed May 29, 1963, Ser. No. 284,021
Claims priority, application Germany, June 6, 1962, C 27,171
1 Claim. (Cl. 260—89.7)

The present invention relates to a process for crosslinking water-soluble polymers of acrylamide and methacrylamide. More particularly, this invention relates to the admixture of aqueous solutions of monomeric acrylamide and methacrylamide with such compounds as are converted, under polymerization conditions, into compounds containing two acrylamido groups of a crosslinking effect, in connection with a subsequent polymerization reaction.

It is already known to crosslink water-soluble derivatives of acrylic acid by adding, for example, small amounts of an alkylidene-bis-acrylamide. The use of such crosslinking agents, however, involves the great disadvantage that these compounds, due to their constitution, possess only a low stability and the tendency to easily polymerize, which requires special precautions during their production and storage. Moreover, said compounds are difficultly preparable, especially from the technical point of view and can be obtained with unsatisfactory yields only.

Now we have found that the before-mentioned disadvantages can be avoided by producing the monomeric compounds containing the crosslinkable bisacrylamido groups only shortly before the polymerization so that, immediately after being formed, they enter into the copolymerization with crosslinkage.

Suitable compounds under the present invention are compounds of the formula

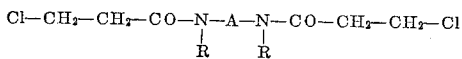

in which each R is a substituent of the group consisting of hydrogen, methyl and ethyl and A is a bivalent radical of the group consisting of alkylene containing between 2 and 6 carbon atoms, phenylene, toluylene, xylylene, a radical of the formula —CH$_2$—CH$_2$—NH—CH$_2$—CH$_2$— and a radical of the formula

—CH$_2$—CH$_2$—NH—CH$_2$—CH$_2$—NH—CH$_2$—CH$_2$—

Useful compounds of such type yielding the crosslinking components include, for example, 1,2-di-(β-chloropropionamido)-ethane, 1,2-di-(β-chloropropionyl-N-methylamido)-ethane, 1,2-di-(β-chloropropionyl-N-ethylamido)-ethane, 1,6-di-(β-chloropropionamido)-hexane, bis-(β-chloropropionamidoethyl)-amine, 1,3-di-(β-chloropropionamido)-benzene, 2,4-di-(β-chloropropionamido)-toluene and the bis-β-chloropropionyl derivatives of triethylenetetramine.

It is an object of the present invention to incorporate these compounds, together with an amount of an alkali hydroxide, especially potassium hydroxide or sodium hydroxide, being equivalent to the chlorine content of the bis-(β-chloropropionamido) compound, into aqueous solutions of acrylamide and methacrylamide, and subsequently to effect the polymerization and crosslinkage at a temperature below 55° C. by the addition of a redox catalyst.

The aqueous solutions of monomer acrylamide and methacrylamide intended to be crosslinked shall have a content of 3–30% by weight of acrylamide and methacrylamide.

The bis-(β-chloropropionamido) compounds are added to the polymerization solution in an amount of 0.5 to 30% related to the content of the acrylamide and methacrylamide.

Owing to the gradual conversion of the bis-(β-chloropropionamido) compound into the corresponding bisacryloylamido compound by splitting off hydrogen chloride that is bound in the form of an alkali chloride, the bisacrylamido compound enters immediately into the polymerization and crosslinking reaction in the same measure as such compound is formed. As polymerization catalysts there are employed known and conventional redox catalyst systems. Especially suitable are such of the following compositions:

Dimethylaminopropionitrile—ammonium persulfate
Dimethylaminopropionitrile—potassium persulfate
Triethanlamine—ammonium persulfate
Methyl diethanolamine—ammonium persulfate
Dimethyl aminoethanol—ammonium persulfate
Sodium pyrosulfite—potassium persulfate.

The amounts of catalysts to be used in the process of the present invention may be varied in a wide range, which may be useful for regulating the polymerization speed and for influencing the properties of the polymers obtained. It is customary to use amounts of between 4 and 20% by weight of the reducing ingredient and of between 0.25 and 5% by weight of the oxidizing ingredient of the redox catalyst system, the percentages relating to the total weight of the monomers to be polymerized.

The process of the present invention permits the realization of the polymerization and crosslinking reaction at temperatures below 55° C., even at room temperature. Thus, said working method offers the great advantage that the crosslinked polymers can be prepared even in the site of their application. As the gels under the present invention are especially used for soil and masonry stabilization, this advantage, as compared with crosslinked polymers of other compositions, is very considerable.

Moreover, the products preparable under the present invention may be used for other diversified technical purposes, especially as embedding materials.

It is an object of the process of the present invention to permit the concurrent use of such compounds yielding the crosslinking component as are preparable in a simple technical manner.

It is a further object that the compounds containing the said bis-(β-chloropropionamido) groups, in view of their constitution, are very stable during their production and storage.

It is a surprising feature that these compounds, although very difficultly soluble in water, after their being introduced into the aqueous polymerization solution may be converted by means of alkali at the low temperatures used into the corresponding bisacrylamido derivatives, which permits the formation of clear and hard gel masses.

The starting period of the polymerization reaction can be adjusted by regulating the polymerization temperature. A lowering of the starting temperature causes a prolongation of the time between the addition of the component being converted into the crosslinking component and the obvious start of the polymerization. This is a further positive advantage over the conventional method of immediately adding compounds containing bisacrylamido groups, since in this case the influence of the temperature upon the beginning of the polymerization is considerably less. This preference is of importance especially in the use of the present invention for the stabilization of soil formations, where it is necessary to effect at first the impregnation of the soil with the solution containing the monomers and to bring about the starting of the polymerization and crosslinking reaction only after the soil has fully been wetted with the solution.

The invention is further described and illustrated in the examples which follow. All temperatures, unless otherwise indicated, are to be understood to refer to degrees centigrade, and all "parts" and percentages to refer to "parts" and percentages by weight.

*Example 1*

A mixture of 200 parts of acrylamide and 10 parts of 1,2-di-(β-chloropropionamido)-ethane is introduced into 1800 parts of water having a temperature of 20°. After the addition of 100 parts of a 4% aqueous solution of sodium hydroxide, the mixture is admixed with 40 parts of dimethylaminopropionitrile and 75 parts of a 1% aqueous solution of ammonium persulfate. The mixture is cooled down to 18° with vigorous stirring and then allowed to stand. The polymerization reaction starts after about 15 minutes. In the course of another 10 minutes, the temperature of the mixture rises up to 36°, whereby a clear and hard gel is forming.

If, instead of acrylamide, the same amount of methacrylamide is used, a hard and clear gel is also obtained.

*Example 2*

Working as described in Example 1 hereinbefore and using, besides the indicated amounts of the other components, 400 parts of acrylamide and 1600 parts of water, the polymerization starts already 4 minutes after the components have been blended. The reaction mixture comes up to a maximum temperature of 55°. By this way, also a hard and clear gel is obtained.

*Example 3*

A mixture of 85 parts of acrylamide, 15 parts of di-(β-chloropropionamidoethyl)-amine in 800 parts of water is admixed, with stirring, with 75 parts of a 4% aqueous solution of sodium hydroxide. Then 15 parts of dimethylamino-propionitrile and 6 parts of a 5% aqueous solution of ammonium persulfate are added and the mixture, after being stirred for a short time, is allowed to stand. The polymerization starts at 20° after 5 minutes. The gel formation is finished after 15 minutes, whereby the temperature rises up to a maximum of 35°. A very hard gel is obtained.

*Example 4*

95 parts of acrylamide together with 10 parts of 1,3-di-(β-chloropropionamido)-benzene are introduced into 850 parts of water. Then 50 parts of a 4% aqueous solution of sodium hydroxide are added, the mixture is stirred for 30 minutes and is admixed with 10 parts of dimethylaminopropionitrile and 10 parts of a 5% aqueous solution of ammonium persulfate. Without further stirring, a solid gel is forming after about 20 minutes.

*Example 5*

90 parts of acrylamide and 10 parts of 1,2-di-(β-chloropropionyl-N-methylamido)-ethane are stirred for 30 minutes together with 800 parts of water and 65 parts of a 4% aqueous solution of sodium hydroxide. Then 20 parts of dimethylaminopropionitrile and 40 parts of a 1% aqueous solution of ammonium persulfate are added; the mixture is allowed to stand, and after about 12 minutes, a clear and solid gel is obtained.

*Example 6*

85 parts of acrylamide together with 15 parts of di-(β-chloro-propionamidoethyl)-ethylenediamine are introduced into 800 parts of water and, after the addition of 75 parts of a 4% aqueous solution of sodium hydroxide, the mixture is stirred for 15 minutes. 15 parts of dimethylaminopropionitrile and 25 parts of a 2% aqueous solution of potassium persulfate are added with stirring. The gel formation is finished after 20 minutes. An elastic soft gel is obtained.

It is to be understood that the foregoing examples were selected solely for purposes of illustration and that this invention is susceptible to further modification in the manner taught herein. It accordingly is not limited except by the scope of the appended claim.

I claim:

A process for the manufacture of crosslinked polymers of acrylamide or methacrylamide, which comprises introducing into aqueous solutions having a content of 3–30% by weight of acrylamide and methacrylamide, 0.5–30% by weight (related to the acrylamide and methacrylamide content) of a bis-(β-chloropropionamido) compound of the formula $$Cl-CH_2-CH_2-CO-N-A-N-CO-CH_2-CH_2-Cl$$
$$\phantom{Cl-CH_2-CH_2-CO-N}|\phantom{-A-N}|$$
$$\phantom{Cl-CH_2-CH_2-CO-N}R\phantom{-A-N}R$$

in which each R is a substituent of the group consisting of hydrogen, methyl and ethyl and A is a bivalent radical of the group consisting of alkylene containing between 2 and 6 carbon atoms, phenylene, toluylene, xylylene, a radical of the formula —CH$_2$—CH$_2$—NH—CH$_2$—CH$_2$— and a radical of the formula

—CH$_2$—CH$_2$—NH—CH$_2$—CH$_2$—NH—CH$_2$—CH$_2$— together with an amount of an alkali hydroxide being equivalent to the chlorine content of this compound and effecting the polymerization at a temperature below 55° C. by the addition of a redox catalyst.

References Cited by the Examiner
UNITED STATES PATENTS

| | | | |
|---|---|---|---|
| 2,827,397 | 3/1958 | Affleck | 260—86.1 |
| 3,134,810 | 5/1964 | Tomcufcil et al. | 260—89.7 |

JOSEPH L. SCHOFER, *Primary Examiner.*

H. I. CANTOR, *Assistant Examiner.*